Aug. 12, 1941.   H. H. LANNING   2,252,382
TRUCK FOR DIESEL LOCOMOTIVES
Filed July 3, 1939   2 Sheets-Sheet 1
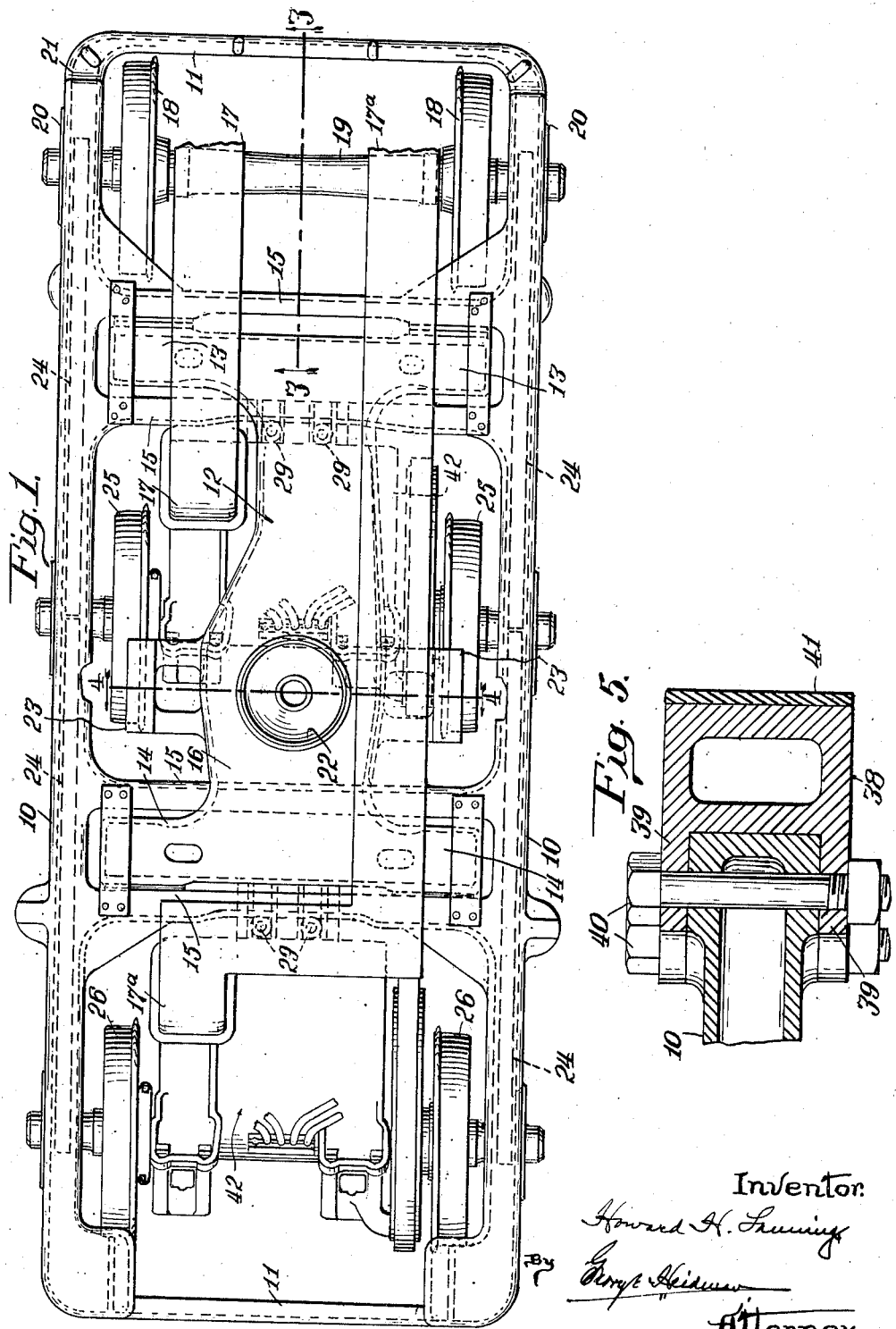
Inventor.
Howard H. Lanning
By George Heidman
Attorney.

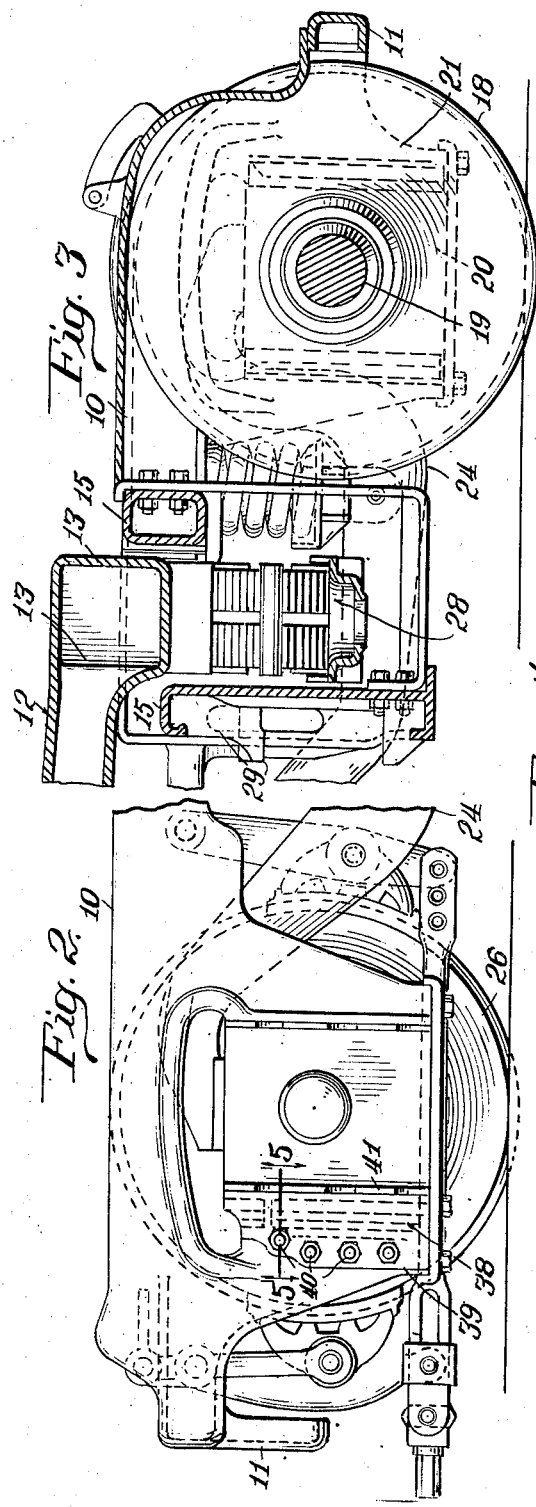

Patented Aug. 12, 1941

2,252,382

UNITED STATES PATENT OFFICE 2,252,382

TRUCK FOR DIESEL LOCOMOTIVES

Howard H. Lanning, Topeka, Kans.

Application July 3, 1939, Serial No. 282,597

8 Claims. (Cl. 105—196)

My invention relates more especially to a six wheel truck intended for use on Diesel locomotives and has for its object the provision of a six wheel truck wherein two pairs of wheels constitute the driving wheels with electric motors operatively connected to the axles of said wheels, while the other or forward pair of wheels constitute the guiding wheels and have no motors connected therewith.

Another object of the invention is the construction and arrangement of a truck as mentioned wherein the load is distributed among the three pairs of wheels so that the amount carried on the driving wheels will be sufficient for adhesion and the amount carried on the idlers or leading wheels will be limited to the amount required for guiding the truck, with the result that wear on the treads and flanges of the truck wheels is materially reduced and a more economical structure is provided; the leading wheels being without brakes.

The invention also contemplates a truck of the character described wherein the structure involves a novel construction of center bolster which affords proper room for motor suspension and air duct method of motor cooling; a construction whereby the center plate and the intermediate axle are arranged out of vertical alignment. That is to say, the center plate is arranged in a vertical plane removed from the vertical plane of the intermediate axle to provide clearance which enables insertion and removal of the center pin to be readily made; the shifting of the center plate providing for the proper distribution of the load on the driving wheels.

Another object of the invention is the provision of a center plate construction which involves a novel method of oiling, dust seal and floating liner, whereby better operation is obtained and the life of the center bearing enhanced.

The invention also involves a truck wherein a wall of the pedestal for the journal box of each driving wheel is removably secured to the truck frame to enable the pedestal wall or block to drop down and permit the wheels and their axles as well as the motor associated with the axle to be moved rearwardly and then dropped down thereby affording easy access to the motor.

The above enumerated objects and the advantages, as well as other advantages inherent in the construction, will all be readily comprehended from the detailed description of the embodiment of my invention as illustrated in the accompanying drawings wherein:

Figure 1 is a plan view of my improved truck.

Figure 2 is a side elevation of the rear end of the truck, with portions of the side frame and equalizer bar broken away.

Figure 3 is a sectional elevation of the forward end of the truck, the view being taken substantially on the line 3—3 of Figure 1 as indicated by the arrows.

Figure 4 is a cross-sectional view of the center bearing of the truck, taken substantially on the line 4, 4 of Figure 1 as indicated by the arrows.

Figure 5 is a detail sectional view of the removable portion or wall of one of the driving wheel pedestals; the view being taken on the line 5—5 of Figure 2 as indicated by the arrows.

Figure 6 is a perspective view of one of the center pin elements.

Figure 7 is a similar view of the spreader pin of the composite center pin.

The exemplification of the invention discloses a continuous truck frame composed of the side members 10, 10, joined at both ends by the end members 11, 11. The truck involves a special type of center bolster 12 disposed longitudinally of the truck and terminating in laterally disposed ends 13, 14, disposed toward opposite sides of the truck; the longitudinally disposed body portion of the bolster arching into the ends 13, 14 to permit the latter to be disposed between the respective pair of spaced transom members 15. The bolster 12 is of the irregular shape shown in Figure 1 and is bellied or increased in transverse width toward its rear end as shown at 16, with the median line of the narrow forward end of the bolster disposed to one side of the longitudinal center line of the truck so as to provide a comparatively large opening or space between the bolster and one side of the truck adjacent one of the forward transom members 15 as shown at the upper right hand end of Figure 1, in order to enable installation of the downwardly extending portion of a suitable motor air duct shown at 17 and to provide proper access thereto.

The forward end of the truck, namely the right hand end in Figure 1, is provided with a pair of idler wheels 18, 18, whose axle 19 is journaled at each end in a well known type of journal-box 20, slidably mounted between the jaws or sides of the pedestal 21 formed integral with the side members 10 of the truck frame.

The bellied portion 16 of the main body of the bolster is provided with the center bearing 22 and at opposite sides has the side bearing providing extensions or arms 23, 23.

My improved truck, by reason of the special bolster construction and arrangement of the intermediate pair of driving wheels relative to the center bearing 22 is provided with equalizer bars of different lengths,—a portion of the forward equalizer bar being shown at 24 in Figure 3, while a portion of the equalizer bar between the two driving wheels 25, 26 is shown at 24 in Figure 2,—the truck also being provided with a suitable design of spring suspension suspended from the truck frame and shown at 28 in Figure 3 on which the forward end 13 of the bolster rests; a substantially similar spring suspension being employed for supporting the rear end 14 of the bolster.

By reason of the particular type of bolster shown space is provided for the traction motor (not shown) on the intermediate axle of wheels 25, 25, and also proper space is afforded for suspending the nose of the motor on the inside face of the inner transom member 15, through the medium of lugs 29, shown in dotted lines in Figure 1, with one lug shown in full lines in Figure 3; the motor being, of course, mounted on the axle of the drive wheels in the usual manner.

In trucks of this character as heretofore constructed the center plate was disposed directly over the axle of the center pair of wheels, with the electric motors operatively connected with and driving the two axles and their associated wheels located at the ends of the truck, while the center pair of wheels merely constituted load carrying and traction providing wheels. With the forward pair of wheels arranged as driving wheels, the pressure of the wheel flanges on the rails is very great and caused a tendency of these wheel flanges to climb up over the rail due to the application of the forces which induced the wheels to turn, because the wheels used the rail as a purchase to force the pedestals and truck frame forward. When these wheels come in contact with a rail in lateral directions, the flange pressure required to turn the truck frame is the same under the same speed as that in the case where idler wheels are used. However, the friction may increase to a very high point and furnish the power wheel a purchase on the rail through the side of the flange which might easily overcome the weight holding the wheel down and thus raise the wheel up on the rail as the turning torque acts in a downward direction (when the forward wheels are drivers) on the rail—the front driver wheels, in view of the greater resistance encountered at curves or laterally disposed tracks, tending to climb the rail.

In my improved truck the forward wheels have no pulling or driving power applied thereto and constitute guiding wheels which take up the lateral thrusts first encountered on curved or uneven tracks, causing the truck frame to turn slightly, due to the pressure on the front bearings and boxes toward one side transmitted through the wheel flanges and wheels. The tendency for these guiding wheels to turn is due entirely to the horizontal forces acting upon the truck frame and the journal boxes and the flange pressure on the guiding wheels can be very great without inducing the guiding wheels to climb up, because the forces which turn these wheels are directed upon the journals in a horizontal direction, with the result that greater safety in high speed operation is provided by my improved truck.

Furthermore, in my improved truck the center plate, as previously stated, is not disposed directly above the intermediate axle, as is the case in trucks as heretofore constructed, and clearance is thereby provided which enables removal of the center-pin of the bearing from the bottom of the truck to be easily made; while at the same time the shifting or placement of the center plate as stated enables a proper distribution of the load on the driving wheels whereby the amount carried by the driving wheels will be sufficient for adhesion and the amount carried on the idlers or forward wheels will be limited to the amount required for guiding.

In Figure 4, the construction of my center bearing is more clearly disclosed in connection with the body bolster, a portion of which is shown with its center plate 30 arranged in the center bearing 22 of the truck bolster and seated on a floating liner 31, preferably in the nature of a perforated anti-friction metal plate such as bronze, which is properly lubricated through the medium of an oil pipe 32 located in an opening in the side wall of the bearing socket of the center plate of the truck; while the juncture between the bearing members of the truck and of the body bolster is provided with a dust seal 33, consisting of a fibre ring, maintained in place by the annular shoulder or rib 33$^a$ on the body bolster; the fibre sealing ring 33 preventing ingress of dirt to the bearing. The composite or split center pin consisting of the two substantially semi-cylindrical members 34, 34, flanged at the ends of their outer arcuate sides,—after insertion through the registering openings in the bearing members of the body bolster and of the truck bolster,—are forced apart and their flanges brought into overlapping relation with the bearing members by the wedge or spreader pin 35 driven upwardly therebetween; the lower end of the pin being preferably headed as shown. This spreader or wedging pin 35 is held in place by a keeper plate 36 resting on and removably secured to the opposingly disposed flanges 37 formed on the bottom of the truck bolster. As the center bearing of my improved truck is disposed rearwardly of the intermediate axle easy access to the center bearing may be had from the bottom of the truck and removal of the keeper plate (preferably held in place by bolts) permits complete removal of the composite or split center pin.

In trucks as heretofore constructed with the pedestals for the journal-boxes of the driving wheels made integral with the side frame members of the truck, considerable difficulty was encountered when it became necessary to remove or replace the motors. In order to overcome this difficulty I provide the pedestals of the driving wheel journal-boxes with a removable block or side wall 38, shown in detail in Figure 5. The removable side wall or block 38 is preferably bifurcated on one side as shown at 39, 39, to receive a portion of the side frame 10 therebetween; the removable side wall member being held in place by a suitable number of bolts as shown at 40; while the opposite or journal-box engaging side of the side wall member 38 is preferably provided with a wear plate 41. It will be understood that the pedestals for the journal-boxes of the two pairs of driving wheels 25, 26 are each provided with a removable side or wall 38. Upon removing the bolts 40, the pedestal blocks 33 will drop down and permit the drive axles, with the wheels, and the motors (outlined and indicated at 42 in Figure 1) secured thereto to be moved rearwardly off the suporting lugs and to drop down for easy access.

With my improved construction the truck is aligned to track curvatures by the forward pair of idlers or guiding wheels 18, 18, before allowing the power wheels to enter the curve with the result that a great saving in wear on the flanges of the power wheels is obtained and greater safety from derailment is provided—namely derailment due to the traction motor armature seizing in the frame, resulting from armature bearing or armature banding failures, because the power wheels of my truck will slide along the rails which, however, is not possible with trucks as heretofore constructed and the mishaps or failures just mentioned would cause derailment.

My improved construction of center bolster is designed to afford room for a motor mounted on the intermediate wheel-axle and also for the air duct which extends lengthwise of the truck from some suitable source of air supply and discharges adjacent the motor on the intermediate axle as indicated at 17 in Figure 1 and also at 17a adjacent the motor on the rear drive axle, thus providing forced ventilation for the motors, the only successful cooling method in use for cooling traction motors in high speed service.

The particular exemplification of the invention has been described in terms employed for purposes of description and not as terms of limitation because modifications are possible and may be made without, however, departing from the spirit of invention as defined in the appended claims.

What I claim is:

1. A truck of the character described having a frame provided with two pairs of transom members unequally spaced from the ends of the frame, with one pair arranged in closer proximity to the forward end of the frame; a bolster disposed longitudinally of the frame intermediate of the two pairs of transom members, arched across the adjacent transom member of both pairs and terminating in transversely extending ends arranged between the transom members of each pair, the bolster in proximity to its rearward end being provided with a center plate; the truck being provided with three unequally spaced wheel carrying axles, the intermediate axle being arranged forward of the center plate portion of the bolster.

2. In a truck of the character described, a truck bolster having an elongated body portion adapted to be disposed longitudinally of the truck and having transversely disposed ends, the body portion being bellied toward its rear end and provided with laterally disposed side-bearing providing arms, said bellied portion being also provided with a center bearing having a lubricant introducing tube in the side wall of said center bearing and provided with a perforated floating liner.

3. In a truck of the character described, a truck bolster formed with a cupped center bearing having a lubricant introducing pipe in the side wall of the cupped portion, while the bottom of the bolster is formed with opposingly arranged flanges; a split center pin with a spreader pin insertible upwardly therebetween; and a keeper plate for said spreader pin removably secured to said flanges.

4. In a truck of the character described, a continuous truck frame provided with spaced apart transom members, a bolster composed of an elongated body portion terminating in transversely disposed end portions and having an integral center plate in proximity to the rear end, the body portion of the bolster toward the forward end being inset to provide an air duct receiving passage between the bolster and the truck side frame; a longitudinally split center-pin removable from the bottom of the bolster; and a keeper plate for said center-pin removably secured to the bottom of the bolster.

5. In a truck of the character described, a truck frame provided with two pairs of transom members located on opposite sides of and at different distances from the transverse center of the frame, three pairs of unequally spaced wheels, with the intermediate pair arranged in closer proximity to the forward pair of wheels, the intermediate pair and the pair adjacent the rear end of the truck constituting the driving wheels, while the pair of wheels adjacent the forward end of the truck are idlers and constitute guide wheels; a pair of equalizer bars of unequal lengths operative intermediate of the respective wheels; and an elongated bolster terminating in laterally extending ends at opposite sides of its longitudinal center, arranged across the inner transom member of each pair with the end portions of the bolster extending downwardly between the transom members of each pair, the bolster having a center plate arranged rearward of its transverse center line and rearward of the intermediate pair of wheels and the body of the bolster forward of the center plate being inset on one longitudinal side.

6. In a truck of the character described, a continuous frame provided with transom members arranged in pairs and having three pairs of journal-box receiving pedestals unequally spaced from opposite ends of the truck; journal-boxes mounted in the pedestals; a pair of equalizer bars on each side of the truck having upwardly disposed ends resting on the respective journal-boxes, the equalizer bars between the intermediate and the rear journal-boxes being of greater length than the equalizer bars between said intermediate journal-boxes and the forward journal-boxes; a one-piece bolster disposed longitudinally of the frame between the pairs of transom members at opposite ends of the frame, extending across one transom member of each pair and terminating at both ends in oppositely disposed portions arranged between the transom members of the two pairs, the bolster having a center plate and laterally disposed side bearing arms rearward of its transverse center line and arranged rearward of the vertical plane of the intermediate journal boxes; and spring suspension means operatively intermediate the truck frame and the laterally disposed ends of the bolster.

7. In a truck of the character described, a frame provided with two pairs of spaced transom members arranged unequal distances from the adjacent ends of the frame; a one piece bolster disposed longitudinally of the frame between the two pairs of transom members, arched toward its ends to extend over the inner adjacent transom member of each pair and terminating in transversely extending ends disposed between the transom members of each pair, the bolster rearward of its transverse center line being enlarged and provided with an integral center plate and laterally disposed side bearing arms.

8. In a truck of the character described provided with three pairs of unequally spaced wheels whose journals are mounted in slidably mounted journal boxes, the intermediate pair of wheels and the pair of wheels at the rear end of the truck constituting the driving wheels while the pair of wheels at the forward end of the truck are idlers and constitute the guide wheels; two pairs of equalizer bars, one pair resting on the journal boxes of the guide wheels and of the intermediate drive wheels while the other pair rests on the journal boxes of the two pairs of drive wheels; the frame of the truck being provided with two pairs of spaced apart transom members located unequal distances on opposite sides of the transverse center line of the truck; a one-piece bolster disposed lengthwise of the truck intermediate of the two pairs of transom members and terminating in laterally extending portions having downwardly disposed ends extending across the inner members of each pair and between the respective transom members of each pair and spaced from the side frames, the bolster rearward of its transverse center being provided with a center plate and with side bearing arms coincident with the center plate and extending laterally from opposite longitudinal sides of the bolster; and spring means operatively intermediate the ends of the bolster and the truck side frames.

HOWARD H. LANNING.